United States Patent
Batni et al.

(12) 
(10) Patent No.: US 7,580,512 B2
(45) Date of Patent: Aug. 25, 2009

(54) SELECTION OF INCOMING CALL SCREENING TREATMENT BASED ON EMOTIONAL STATE CRITERION

(75) Inventors: Ramachendra P. Batni, Phoenix, AZ (US); Ranjan Sharma, New Albany, OH (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 638 days.

(21) Appl. No.: 11/168,633

(22) Filed: Jun. 28, 2005

(65) Prior Publication Data

US 2007/0003032 A1     Jan. 4, 2007

(51) Int. Cl.
*H04M 1/64* (2006.01)

(52) U.S. Cl. .............. 379/88.19; 379/142.17; 434/236; 600/23; 600/300; 704/207; 704/234; 704/248; 704/270

(58) Field of Classification Search .......... 379/88.19, 379/93.23, 142.17; 455/418; 704/270, 231, 704/207, 234, 248; 434/236; 600/23, 300
See application file for complete search history.

(56) References Cited

U.S. PATENT DOCUMENTS

| | | | | | |
|---|---|---|---|---|---|
| 3,691,652 | A | * | 9/1972 | Clynes | 434/236 |
| 4,093,821 | A | * | 6/1978 | Williamson | 704/207 |
| 4,490,840 | A | * | 12/1984 | Jones | 704/276 |
| 4,931,934 | A | * | 6/1990 | Snyder | 434/236 |
| 5,539,861 | A | * | 7/1996 | DeSimone | 704/234 |
| 5,647,834 | A | * | 7/1997 | Ron | 600/23 |
| 5,860,064 | A | * | 1/1999 | Henton | 704/260 |
| 5,987,415 | A | * | 11/1999 | Breese et al. | 704/270 |
| 6,006,188 | A | * | 12/1999 | Bogdashevsky et al. | 704/270 |
| 6,173,260 | B1 | * | 1/2001 | Slaney | 704/250 |
| 6,363,346 | B1 | * | 3/2002 | Walters | 704/231 |
| 6,574,471 | B1 | * | 6/2003 | Rydbeck | 455/418 |
| 6,638,217 | B1 | * | 10/2003 | Liberman | 600/300 |
| 7,222,075 | B2 | * | 5/2007 | Petrushin | 704/270 |
| 7,248,677 | B2 | * | 7/2007 | Randall et al. | 379/93.23 |
| 7,266,499 | B2 | * | 9/2007 | Surace et al. | 704/270 |
| 7,487,090 | B2 | * | 2/2009 | Creamer et al. | 704/248 |

* cited by examiner

*Primary Examiner*—Gerald Gauthier

(57) ABSTRACT

An incoming call screening treatment is selected for a call to a called communication device based on an emotional state criterion input by a user of the called communication device.

16 Claims, 3 Drawing Sheets

100

202

| | Caller | Normal Incoming Call Screening Treatment | Emotional State Criterion |
|---|---|---|---|
| 204 | #1 | Send to Assistant | ☺ |
| 206 | #2 | Call Completion | ☺ |
| 208 | #3 | Call Completion | ☹ |
| 210 | #4 | Send to Assistant | N/A |
|  | ... | ... | ... |
| 212 | Group #1 | Send to Voicemail | ☺ |
|  | ... | ... | ... |

100

202 ↘

| Caller | Normal Incoming Call Screening Treatment | Emotional State Criterion |
|---|---|---|
| #1 | Send to Assistant | ☺ |
| #2 | Call Completion | ☺ |
| #3 | Call Completion | ☹ |
| #4 | Send to Assistant | N/A |
| ... | ... | ... |
| Group #1 | Send to Voicemail | ☺ |
| ... | ... | ... |

204 — #1 row
206 — #2 row
208 — #3 row
210 — #4 row
212 — Group #1 row

| Emotional State Criterion | Emotional State Criterion Treatment |
|---|---|
| ☺ | Call Completion |
| ☹ | Send to Voicemail |
| ... | ... |

304 — ☺ row
306 — ☹ row

| Universal Override Emotional State Criterion | Universal Override Emotional State Criterion Treatment |
|---|---|
| ☺ | Call Completion |
| ☹ | Send to Voicemail, except provide call completion to Callers #2 and #3 |
| ... | ... |

404 — ☺ row
406 — ☹ row

FIG. 4

SELECTION OF INCOMING CALL SCREENING TREATMENT BASED ON EMOTIONAL STATE CRITERION

CROSS-REFERENCE TO RELATED APPLICATION

This application contains subject matter that is related to the subject matter of the following application, which is assigned to the same assignee as this application. The below-listed application is hereby incorporated herein by reference in its entirety:

"SELECTION OF RINGBACK TONE INDICATIVE OF EMOTIONAL STATE THAT IS INPUT BY USER OF CALLED COMMUNICATION DEVICE," by Ramachendra P. Batni and Ranjan Sharma, application Ser. No. 11/015,609, filed Dec. 17, 2004.

TECHNICAL FIELD

The invention relates generally to communications and more particularly to incoming call screening services.

BACKGROUND

Known incoming call screening services (e.g., do-not-disturb services) allow a user to specify which call treatment to use for incoming calls. The user may provision the incoming call screening treatment to apply to all incoming calls or a subset of incoming calls. Incoming calls may be given one of several possible termination treatments, such as: normal call termination, call termination with distinctive alerting, call forwarded to voicemail, call forwarded to another number, call routed to a specific announcement, or call blocked. The incoming call screening service is supported by standards (e.g., ANSI Wireless Standards TIA/EIA/IS-771, Wireless Intelligent Network Standards, December 1998, "Incoming Call Screening (ICS)").

The user may employ the incoming call screening service to provision different incoming call screening treatments to apply to calls with different characteristics. For example, the user may provision calls from a first calling party to receive normal call termination, and calls from a second calling party to be forwarded to voicemail. The user may provision the incoming call screening service to use a number of screening criteria related to calling party characteristics, called party characteristics, or other call characteristics to determine which incoming call screening treatment is appropriate. To select the appropriate incoming call screening treatment for an incoming call, the incoming call screening service uses specific, quantitative criteria, such as: calling party number, calling party area code and/or office code, password provided by calling party, called party location, serving mobile switching center identification, status of called party features (e.g., call forwarding feature, do-not-disturb feature), date, time, and date and time ranges.

The incoming call screening service compares the objective characteristics of the incoming call to the incoming call screening criteria to determine which incoming call screening treatment to use for the incoming call. The incoming call screening service does not allow the user to create incoming call screening criteria based on subjective factors. As one shortcoming, the incoming call screening service limits the level of customization provided to the user of the called communication device by not allowing subjective incoming call screening criteria.

Thus, a need exists for one or more incoming call screening treatment selection criteria based on subjective factors selected by a user of a called communication device.

SUMMARY

An incoming call screening service provides incoming calls with one of several possible call treatments. The incoming call screening service allows a user of the called communication device to input incoming call screening criteria that indicate which call treatment to use for incoming calls in various circumstances. The incoming call screening criteria may be based on subjective factors, such as an emotional state input by the user of the called communication device.

In one embodiment, there is provided a method for selecting an incoming call screening treatment for a call to a called communication device based on an emotional state criterion input by a user of the called communication device.

In another embodiment, there is provided a method for: receiving an indication of an emotional state and a corresponding incoming call screening treatment input by a user of a called communication device; receiving an indication that the user activated the emotional state as an incoming call screening treatment criterion for a call from a calling party to the called communication device; and selecting the incoming call screening treatment, that corresponds to the emotional state, for the call from the calling party to the called communication device.

In yet another embodiment, there is provided an article comprising one or more computer-readable signal-bearing media. The article comprises means in the one or more media for selecting an incoming call screening treatment for a call to a called communication device based on an emotional state criterion input by a user of the called communication device.

DESCRIPTION OF THE DRAWINGS

Features of exemplary implementations of the invention will become apparent from the description, the claims, and the accompanying drawings in which:

FIG. 2 is a representation of one implementation of an incoming call screening network profile employed by the one or more of the intelligent network platforms of the apparatus of FIG. 1.

FIG. 3 is a representation of one implementation of an emotional state criterion result table employed by the one or more of the intelligent network platforms of the apparatus of FIG. 1.

FIG. 4 is a representation of one implementation of an emotional state override profile employed by the one or more of the intelligent network platforms of the apparatus of FIG. 1.

DETAILED DESCRIPTION

Figure 1:
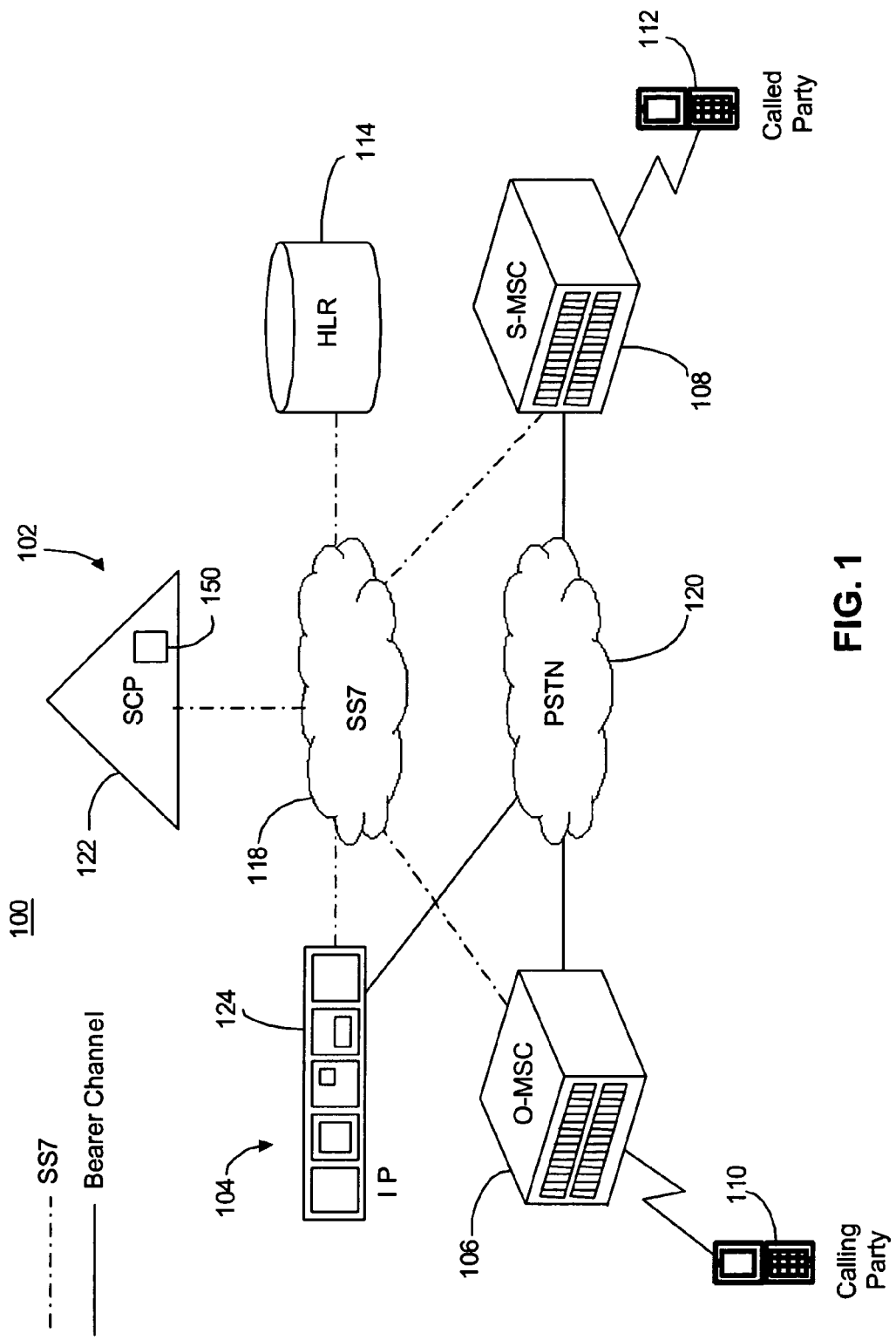
FIG. 1 is a representation of one implementation of an apparatus that comprises one or more intelligent network platforms, one or more mobile switching centers, a calling communication device, and a called communication device.

Turning to FIG. 1, an apparatus 100 provides an incoming call screening service for wireless and/or wire-line telecommunication systems. The apparatus 100 in one embodiment comprises one or more intelligent network ("IN") platforms 102 and 104, one or more mobile switching centers ("MSCs") 106 and 108, a calling communication device 110, and a called communication device 112. In one example, the apparatus 100 further comprises a home location register ("HLR") 114 associated with the called communication device 112.

A signaling network 118 communicatively couples the intelligent network platforms 102 and 104, the MSCs 106 and 108, and the home location register 114. The signaling network 118 in one example comprises a signaling system 7 ("SS7") network that supports signaling traffic. A bearer network 120 communicatively couples the intelligent network platform 104 and the MSCs 106 and 108. The bearer network 120 in one example comprises a public switched telephone network ("PSTN") that supports bearer traffic.

The intelligent network platforms 102 and 104 comprise telephony network platforms. The intelligent network platforms 102 and 104 support intelligent network technology and standards. In one example, the intelligent network platforms 102 and 104 comprise wireless intelligent network ("WIN") platforms. In one example, the intelligent network platforms 102 and 104 comprise Customized Applications for Mobile network Enhanced Logic ("CAMEL") platforms. Exemplary embodiments of the intelligent network platforms 102 and 104 comprise one or more of a service control point ("SCP") 122 and a intelligent peripheral ("IP") 124. The SCP 122 comprises an instance of a recordable data storage medium 150, as described herein.

The SCP 122 serves to provide an incoming call screening service. The SCP 122 allows a user of the called communication device 112 to input incoming call screening criteria that indicate which call treatment to use for incoming calls in various circumstances. Incoming calls may be given one of several possible termination treatments, such as: normal call termination, call termination with distinctive alerting, call forwarded to voicemail, call forwarded to another number, call routed to a specific announcement, call blocked, or the like.

The incoming call screening criteria in one example comprise an emotional state criterion input by the user of the called communication device 112. The emotional state criterion associates a specific call treatment with an emotional state set by the user. The emotional state is changeable by the user and may comprise a human emotion, such as happy, sad, angry, confused, embarrassed, disappointed, or the like. In one example, the emotional state is represented on the called communication device 112 by an emoticon, such as a smiling emoticon, frowning emoticon, angry emoticon, winking emoticon, crying emoticon, hot emoticon, or the like. In another example, other methods may be used to represent the emotional state, such as: text phrases (e.g., "happy", "sad", etc); hand gestures (e.g., thumbs up, thumbs down, etc); pictures (e.g., sunny day picture, rainy day picture, etc); or the like.

In one example, the SCP 122 employs the emotional state criterion to override one or more objective criteria to determine the incoming call screening treatment for the call. In another example, the SCP 122 employs the emotional state criterion in combination with one or more objective criteria to determine the incoming call screening treatment for the call. Examples of the available objective criteria comprise: calling party number, calling party area code and/or office code, password provided by calling party, called party location, serving mobile switching center identification, status of called party features (e.g., call forwarding feature, do-not-disturb feature), date, time, and date and time ranges.

The user of the called communication device 112 may provision relative priority levels for the emotional state criterion and one or more objective criteria. For example, the user may choose an order for the SCP 122 to employ the available criteria. The SCP 122 determines the incoming call screening treatment for the call by employing the emotional state criterion and the one or more objective criteria in an order based on the relative priority levels set by the user.

To set up the emotional state criterion, the user associates an incoming call treatment with an emotional state, such as happy. For example, after the user activates the emotional state criterion and sets the current emotional state to happy, the SCP 122 will select the incoming call treatment that is associated with the happy emotional state for the incoming calls. The user may also set up the emotional state criterion to associate a different incoming call treatment with a sad emotional state. After the user sets the current emotional state to sad, the SCP 122 will select the different incoming call screening treatment that is associated with the sad emotional state for the incoming calls.

In one example, the user of the called communication device 112 is very happy and wishes to tell everyone the great news (e.g., birth of a child). The user in one example decides to override the default incoming call screening treatment for incoming calls. For example, the user may activate the emotional state criterion and set the emotional state to happy to override the default call screening treatment in favor of allowing connection of all incoming calls. At a later time, the user may deactivate the emotional state criterion to revert back to the default incoming call screening treatment.

In another example, the user of the called communication device 112 is depressed (e.g., because of some bad news). The user does not wish to be disturbed with incoming calls for a period of time. For example, the user may activate the emotional state criterion and set the emotional state to sad to override the default call screening treatment in favor of sending incoming calls to voicemail, except for incoming calls from select important calling parties (e.g., spouse, important customers, boss). At a later time, the user may deactivate the emotional state criterion to revert back to the default incoming call screening treatment.

The user of the called communication device 112 inputs incoming call screening criteria to set up the incoming call screening service. In one example, the user employs a web interface to enter the incoming call screening criteria. In another example, the user employs a feature code or short message to enter the incoming call screening criteria. In yet another example, the user employs an interactive voice response or wireless application protocol menu presented by the called communication device 112 to enter the incoming call screening criteria. The user may employ the web interface for an initial configuration of the incoming call screening service and then use a menu on the called communication device 112 to make adjustments. For example, the user may use a menu on the called communication device 112 to set the current emotional state stored in an incoming call screening network profile 202 (FIG. 2) for specific callers or specific caller groups. In another example, the user may use the menu on the called communication device 112 to set the current universal override emotional state for all callers. The current universal override emotional state is associated with a universal override emotional state profile 402 (FIG. 4). The called communication device 112 in one example displays a plurality of emoticons representative of emotional states for the user to select. For example, the user can associate the emoticons with various callers stored in the incoming call screening network profile 202. In another example, the user can associate the emoticons with all callers in the emotional state override profile 402.

In one example, the SCP 122 determines that one or more characteristics of the incoming call match one or more incoming call screening criteria set up by the user of the called communication device 112. If the characteristics of the incoming call match a particular call screening criterion, then the SCP 122 selects the call treatment that is associated with that matched call screening criterion to apply to the incoming call. The SCP 122 accesses an incoming call screening network profile associated with the user to determine the incoming call screening criteria and the associated call treatments. In one example, the SCP 122 stores the incoming call screening network profile. In another example, the IP 124 accesses a storage component that stores the incoming call screening network profile.

In another example, the one or more characteristics of the incoming call do not match the incoming call screening criteria. In this case, the SCP 122 can either select a default call treatment for the incoming call, or alternatively respond to the MSC 106 with a Continue message to have the MSC 106 perform a normal call termination.

In one example, the SCP 122 comprises service logic, American National Standards Institute ("ANSI-41") message handling logic, WIN message handling logic, and an SS7 interface. In another example, the SCP 122 comprises service logic, Global System for Mobile communications ("GSM") message handling logic, and Customized Applications for Mobile network Enhanced Logic message handling logic, and the SS7 interface. The SCP 122 in one example comprises a call controller and a data server. In one example, the call controller and the data server reside on a single platform. In another example, the call controller and the data server reside on different platforms. If the call controller and the data server reside on different platforms, then the call controller queries the data server on the separate platform for subscriber profile information and to determine what incoming call treatment to select for the incoming calls. Any of several messaging protocols, such as Lightweight Directory Access Protocol ("LDAP") or Transmission Control Protocol/Internet Protocol ("TCP/IP"), can be used for communication between the call controller and the data server.

The SCP 122 in one example employs one or more of WIN, CAMEL, ANSI Advanced Intelligent Network ("AIN"), International Telecommunication Union ("ITU-T") Capability Set 1 ("CS-1"), and session initiation protocol ("SIP") signaling to perform incoming call screening. An exemplary employment of WIN signaling is illustrated herein. The SCP 122 receives WIN signaling relating to an incoming call at the MSC 106 for the called communication device 112 and sets parameters in WIN signaling messages to indicate the desired incoming call screening treatment. The IP 124 in one example comprises a voicemail server ("VMS") for the user of the called communication device 112. For example, if the desired incoming call screening treatment is to forward the incoming call to voicemail, then the SCP 122 instructs the MSC 106 to route the incoming call to the IP 124, so the IP 124 may serve as a voicemail server for the incoming call. To route the incoming call to the IP 124, the SCP 122 in one example sets a TerminationList parameter of a WIN signaling message to a directory number of the IP 124. Then, the SCP 122 sends the TerminationList parameter in the WIN signaling message to the MSC 106 that queried the SCP 122 on what action to take for the incoming call. Upon receipt of the WIN signaling message, the MSC 106 connects the call to the IP 124.

The SCP 122 in one example employs WIN signaling, Integrated Services Digital Network User Part ("ISUP") signaling, and ANSI signaling to enable the incoming call screening service. The WIN signaling, ISUP signaling, and ANSI signaling are in accordance with ANSI standards. In one exemplary implementation, the signaling messages follow one or more of ANSI/TIA/EIA-41-D, TIA/EIA/IS-771, and TIA/EIA/IS-826 standards, in addition to ANSI ISUP standards for the bearer connection.

The MSCs 106 and 108 support mobile telecommunication devices, for example, the communication devices 110 and 112. The MSCs 106 and 108 in one example comprise an originating mobile switching center ("O-MSC") 106 and a serving mobile switching center ("S-MSC") 108. For example, the O-MSC 106 supports a home area of the called communication device 112 and the S-MSC 108 supports the called communication device 112 if the called communication device 112 moves to a roaming area. If the called communication device 112 is within the home area supported by the O-MSC 106, then the S-MSC 108 may not be in the call path between the calling communication device 110 and the called communication device 112. For example, the O-MSC 106 would also serve as a S-MSC for the called communication device 112.

Referring to FIGS. 1-2, the user of the called communication device 112 in one example sets the emotional state criterion to different emotional states for different calling communication devices. The emotional states stored in the incoming call screening network profile 202 are used to determine the incoming call screening treatment for individual callers or user-selected groups of callers. For example, the user of the called communication device 112 may set a specific emotional state only for the calling communication device 110. The emotional state may be based on a special relationship between the user of the called communication device 112 and the user of the calling communication device 110. For example, if the user of the called communication device 112 and the user of the calling communication device 110 have been in a fight, then the user of the called communication device 112 could input a sad or angry emotional state for calls from the user of the calling communication device 110. The incoming call screening network profile 202 stores the emotional states input for individual callers or user-selected groups of callers.

The incoming call screening criteria that are input by the user of the called communication device 112 in one example are stored in the incoming call screening network profile 202. The user of the called communication device 112 in one example activates a happy emotional state for calls from caller #1 stored in entry 204 of the incoming call screening network profile 202, a happy emotional state for calls from caller #2 stored in entry 206 of the incoming call screening network profile 202, a sad emotional state for calls from caller #3 stored in entry 208 of the incoming call screening network profile 202, and a happy emotional state for calls from group #1 stored in entry 212 of the incoming call screening network profile 202. The user of the called communication device 112 in one example does not set an emotional state for calls from caller #4 stored in entry 210 of the incoming call screening network profile 202. The incoming call screening network profile 202 may store other incoming call screening criteria (not shown) in addition to the emotional state criterion, such as time of day criteria, day of week criteria, or the like. Furthermore, some entries in the incoming call screening network profile 202 may not have one or more incoming call screening criteria specified.

The emotional state criterion indicates which incoming call screening treatment to select upon receipt of a call from a specific calling party. If the emotional state criterion is not active, the call is subject to a normal call screening treatment. For example, the user of the called communication device 112 has not activated an emotional state criterion for caller #4 stored in entry 210 of the incoming call screening network profile 202. Therefore, caller #4 will receive the normal call screening treatment, which in this case is having the call sent to an assistant.

Referring to FIGS. 1-3, an emotional state criterion result table 302 indicates the resultant incoming call screening treatments that are associated with the various emotional states. For example, entry 304 indicates that the incoming call screening treatment for a call from a caller will be call completion when the user sets a happy emotional state for the caller. Entry 306 indicates that the incoming call screening treatment for a call from a caller will be to send the call to voicemail when the user sets a sad emotional state for the caller. The emotional state criterion result table 302 in one example comprises one or more additional entries to indicate the resultant incoming call screening treatments for other emotional states.

The user of the called communication device 112 may activate the emotional state criterion and set the emotional state in the incoming call screening network profile 202 to override the normal call screening treatment in favor of the emotional state criterion treatment. For example, if an incoming call is received from a caller while the emotional state criterion is activated with the emotional state criterion set to happy for that caller, then the SCP 122 will connect the incoming call to the called communication device 112, as per the information stored in entry 304 of the emotional state criterion result table 302. If an incoming call is received from a caller while the emotional state criterion is activated with the emotional state criterion set to sad for that caller, then the SCP 122 will route the incoming call to voicemail, as per the information stored in entry 306 of the emotional state criterion result table 302.

Referring to FIGS. 1 and 4, the user of the called communication device 112 in one example sets the emotional state criterion to a universal override emotional state. In one example, the universal override emotional state indicates the incoming call screening treatment for all incoming calls. In another example, the universal override emotional state indicates a default incoming call screening treatment and establishes one or more exceptions to the default incoming call screening treatment. Once the user activates a universal override emotional state, the universal override emotional state is used to determine the incoming call screening treatment for all or most incoming calls. The universal override emotional state may override other incoming call screening criteria depending on the relative priority of these criteria as set by the user of the called communication device 112. For example, if the universal override emotional state is set to happy, then the happy emotional state is used, in FIG. 4, to determine the incoming call screening treatment for all or most incoming calls.

The emotional state override profile 402 stores the universal override emotional states. The user of the called communication device 112 in one example sets a call treatment that connects incoming calls to the called communication device 112 to be used when the universal override emotional state is set to happy. Indications of the happy emotional state and associated treatment are stored in entry 404 of the emotional state override profile 402. The user of the called communication device 112 in one example also sets a call treatment that routes incoming calls to voicemail to be used when the universal override emotional state is set to sad. Indications of the sad emotional state and associated treatment are stored in entry 406 of the emotional state override profile 402. The sad override emotional state in one example provides for two exceptions to the default call treatment associated with the sad override emotional state. For example, when the universal override emotional state is set to sad, then all callers except callers #2 and #3 will be sent to voicemail, and callers #2 and #3 will be connected to the called communication device 112.

Figure 5:
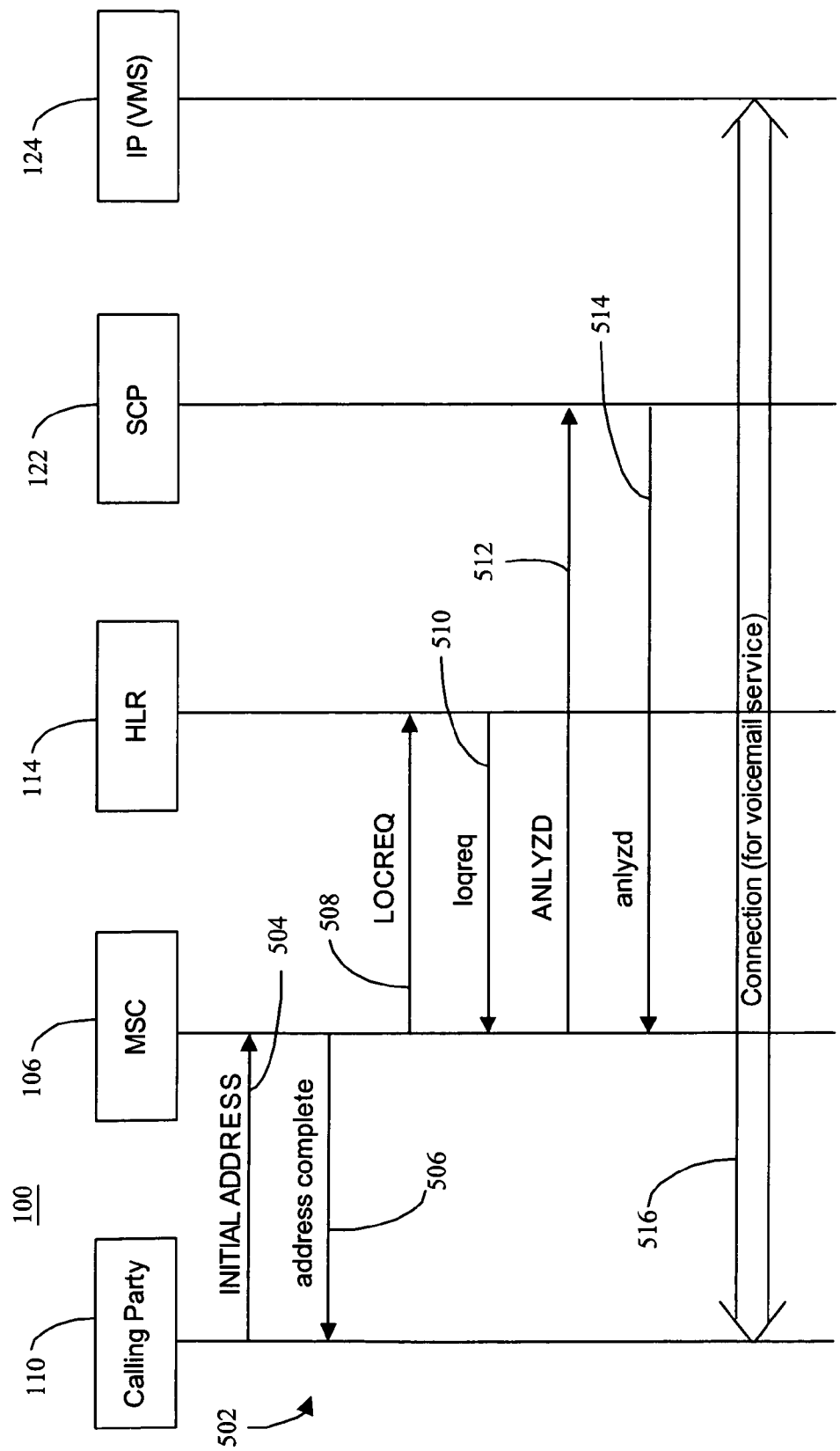
FIG. 5 is a representation of one exemplary message flow that illustrates an exemplary incoming call screening treatment selected by the one or more of the intelligent network platforms of the apparatus of FIG. 1.

Referring to FIGS. 1 and 5, an illustrative description of one exemplary operation of the apparatus 100 is presented, for explanatory purposes. A message flow 502 represents an exemplary incoming call screening treatment. For example, the message flow 502 illustrates forwarding the incoming call to voicemail through exemplary employment of WIN signaling. A user of the called communication device 112 in one example subscribes to the incoming call screening service provided by the SCP 122. The message flow 502 illustrates the incoming call screening service. The user of the called communication device 112 in one example has configured and activated the incoming call screening service prior to the initiation of the message flow 502. The user of the called communication device 112 has assigned incoming call treatments to various emotional states. For example, the message flow 502 illustrates a case where the user has activated an emotional state criterion and the current emotional state indicates to forward the incoming call to voicemail.

To initiate a call to the called communication device 112, the user of the calling communication device 110 dials the telephone number of the called communication device 112 resulting in a call setup message 504 being received at the O-MSC 106. The call setup message 504 in one example comprises an ISUP initial address message. Upon receipt of the call setup message 504, the O-MSC 106 sends an acknowledgement message 506 to the calling communication device 110. The acknowledgement message 506 in one example comprises an ISUP address complete message.

The call setup message 504 indicates that the call is for the called communication device 112. Per normal ANSI-41 operation, the call processing logic in the O-MSC 106 encounters a Mobile_Termination trigger when processing the call to the called communication device 112. Upon encountering the Mobile_Termination trigger, the O-MSC 106 sends a LOCREQ message 508 to the HLR 114 associated with the called communication device 112. Prior to receipt of the LOCREQ message 508, the HLR 114 has been provisioned to return appropriate triggers and address information to the O-MSC 106 based on the characteristics of the call. In another example, where the called communication device 112 comprises a landline telephone, the Central Office switch that supports the called communication device 112 is provisioned with triggers and address information based on the characteristics of the call.

The LOCREQ message 508 comprises a location request invoke message to determine the current location of the called communication device 112. The LOCREQ message 508 employs ANSI-41/WIN signaling. For example, the LOCREQ message 508 comprises an ANSI-41 message with WIN signaling enhancements. The O-MSC 106 sets a TRANSCAP parameter of the LOCREQ message 508 to indicate that the O-MSC 106 is able to process the TRIGADDRLIST parameter. The O-MSC 106 sets a WINCAP parameter to indicate the triggers that are supported by the O-MSC 106. The O-MSC 106 sets a TRIGTYPE parameter to indicate that the Mobile_Termination trigger has been encountered.

The HLR 114 returns a locreq message 510 to the O-MSC 106. The locreq message 510 comprises a location request return result message. The locreq message 510 employs ANSI-41/WIN signaling. For example, the locreq message 510 comprises an ANSI-41 message with WIN signaling enhancements. The HLR 114 sets a TRIGADDRLIST parameter in the locreq message 510 to indicate the Advanced_Termination and Location triggers are armed. For example, the HLR 114 has been provisioned to set the triggers based on the characteristics of the call. Other triggers may be armed based on other services subscribed to by the user of the called communication device 112, such as an Initial_Termination trigger and/or a Called_Routing_Address_Available trigger for prepaid subscribers.

Upon receipt of the locreq message 510, the O-MSC 106 continues the ANSI call processing and encounters the Advanced_Termination trigger and determines from the TRIGADDRLIST parameter to send an ANLYZD message 512 to the SCP 122. The TRIGADDRLIST parameter of the locreq message 510 comprises an indication of the SCP 122. The ANLYZD message 512 comprises a WIN signaling message, for example, an Analyzed Information operation message.

The ANLYZD message 512 comprises calling party information, called party information, and call characteristic information for the incoming call. The ANLYZD message 512 in one example indicates one or more of: a directory number of the calling communication device 110, a directory number of the called communication device 112, the time and date of the incoming call, an identification of the serving mobile switching center, a password provided by the calling party, the called party location, or the like.

Referring to FIGS. 1-3 and 5, the SCP 122 employs the information received in the ANLYZD message 512, and information from the incoming call screening network profile 202 to determine which incoming call screening treatment to select for the incoming call. In one example, the user of the called communication device 112 activated the emotional state criterion and set the emotional state for caller #3 to sad. The calling communication device 110 in one example is represented as caller #3 in entry 208 of the incoming call screening network profile 202. Therefore, upon receipt of the ANLYZD message 512, the SCP 122 accesses the incoming call screening network profile 202 and selects the treatment based on the sad emotional state for the calling communication device 110, per the contents of entry 306 in the emotional state criterion result table 302. For example, the SCP 122 selects the treatment that routes the incoming call to the IP 124. The IP 124 will provide voicemail service to the incoming call from the calling communication device 110.

To route the incoming call to the IP 124, the SCP 122 in one example sets a TerminationList parameter of an anlyzd message 514 to a directory number of the IP 124. The anlyzd message 514 comprises an Analyzed Information return result message. The SCP 122 sends the anlyzd message 514 to the MSC 106 that queried the SCP 122 on what action to take for the incoming call. Upon receipt of the anlyzd message 514, the MSC 106 connects the call to the IP 124 to provide voicemail service to the incoming call. For example, the MSC 106 establishes a connection 516 between the calling communication device 110 and the IP 124.

The apparatus 100 in one example comprises a plurality of components such as computer software and/or hardware components. A number of such components can be combined or divided in the apparatus 100. An exemplary component of the apparatus 100 employs and/or comprises a set and/or series of computer instructions written in or implemented with any of a number of programming languages, as will be appreciated by those skilled in the art.

The apparatus 100 in one example employs one or more computer-readable signal-bearing media. The computer-readable signal-bearing media store software, firmware and/or assembly language for performing one or more portions of one or more embodiments of the invention. An example of a computer-readable signal-bearing medium for the apparatus 100 comprises the recordable data storage medium 150 of the service control point 122. The computer-readable signal-bearing medium for the apparatus 100 in one example comprise one or more of a magnetic, electrical, optical, biological, and atomic data storage medium. For example, the computer-readable signal-bearing medium comprise floppy disks, magnetic tapes, CD-ROMs, DVD-ROMs, hard disk drives, and electronic memory. In another example, the computer-readable signal-bearing medium comprises a modulated carrier signal transmitted over a network comprising or coupled with the apparatus 100, for instance, one or more of a telephone network, a local area network ("LAN"), a wide area network ("WAN"), the Internet, and a wireless network.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. A method, comprising the steps of:

determining an emotional state criterion;

selecting an incoming call screening treatment for a call to a called communication device based on the emotional state criterion;

receiving an indication of a first emotional state for incoming calls from a first calling party;

storing an association between the first emotional state and the first calling party;

receiving an indication of a second emotional state for incoming calls from a second calling party; and storing an association between the second emotional state and the second calling party;

wherein the step of selecting the incoming call screening treatment for the call to the called communication device based on the emotional state criterion input comprises the steps of:

instructing the switching center to perform a first incoming call screening treatment associated with the first emotional state if the call is from the first calling party; and instructing the switching center to perform a second incoming call screening treatment associated with the second emotional state if the call is from the second calling party.

2. The method of claim 1, wherein if the emotional state criterion is not active, the call is subject to a default call screening treatment;

wherein the step of selecting the incoming call screening treatment for the call to the called communication device based on the emotional state criterion comprises the step of:

overriding the default call screening treatment in favor of the incoming call screening treatment based on the emotional state criterion, if the emotional state criterion is active.

3. The method of claim 2, wherein the incoming call screening treatment based on the emotional state criterion is different than the default call screening treatment for the call.

4. The method of claim 1, wherein the incoming call screening treatment for the call comprises one of:
  normal call termination;
  call termination with distinctive alerting;
  call forwarded to voicemail;
  call forwarded to another number;
  call routed to a specific announcement; or
  call blocked.

5. The method of claim 1, wherein the step of selecting the incoming call screening treatment for the call to the called communication device based on the emotional state criterion comprises the steps of:
  selecting a first incoming call screening treatment for the call if the emotional state criterion indicates a happy emotional state at a time of the call; and
  selecting a second incoming call screening treatment for the call if the emotional state criterion indicates a sad emotional state at the time of the call, wherein the second incoming call screening treatment is different than the first incoming call screening treatment.

6. The method of claim 1, wherein the step of selecting the incoming call screening treatment for the call to the called communication device based on the emotional state criterion comprises the step of:
  employing the emotional state criterion in combination with at least one objective criteria to determine the incoming call screening treatment for the call.

7. The method of claim 1, wherein the step of selecting the incoming call screening treatment for the call to the called communication device based on the emotional state criterion comprises the step of:
  employing the emotional state criterion to override at least one objective criteria to determine the incoming call screening treatment for the call.

8. The method of claim 1, wherein the call comprises a first call, the method further comprising the steps of:
  receiving at least one objective criteria that indicate to use a default incoming call screening treatment, wherein the objective criteria comprise at least one of: time of day criteria, day of week criteria, day of year criteria, and calling party identity criteria;
  receiving the emotional state criterion that indicates to use the incoming call screening treatment;
  selecting the incoming call screening treatment based on the emotional state criterion for the first call, if the emotional state criterion is activated for the first call; and
  selecting the default incoming call screening treatment for a second call, if the emotional state criterion is not activated for the second call.

9. The method of claim 1, further comprising the steps of:
  receiving the emotional state criterion;
  adding the emotional state criterion to at least one entry in an incoming call screening network profile; and
  accessing the incoming call screening network profile to employ the emotional state criterion to select the incoming call screening treatment for the call.

10. The method of claim 1, further comprising the steps of:
  receiving an indication of relative priority levels for the emotional state criterion and at least one entry objective criteria; and
  employing the emotional state criterion and the at least one entry objective criteria in an order based on the relative priority levels to determine the incoming call screening treatment for the call.

11. The method of claim 1, wherein one of a website interface, short message, feature code, interactive voice response, and wireless application protocol is used to provision the emotional state criterion to achieve the incoming call screening treatment for the call.

12. The method of claim 1, further comprising the steps of:
  receiving an Analyzed Information message, upon a switching center encountering an Advanced Termination trigger for the call, wherein the Analyzed Information message comprises calling party information, called party information, and call characteristic information for the call;
  checking an incoming call screening network profile to determine which incoming call screening treatment is required for the call; and
  sending an Analyzed Information return result message to the switching center to indicate the incoming call screening treatment, based on the emotional state, to perform for the call.

13. A method, comprising the steps of:
  receiving an indication of an emotional state and a corresponding incoming call screening treatment from a called communication device;
  receiving an indication that the emotional state is activated as an incoming call screening treatment criterion for a call from a calling party to the called communication device; and
  selecting the incoming call screening treatment, that corresponds to the emotional state, for the call from the calling party to the called communication device, the call comprising a first call, wherein the step of selecting the incoming call screening treatment, that corresponds to the emotional state, for the first call from the calling party to the called communication device comprises the step of:
  selecting the incoming call screening treatment, that corresponds to the emotional state, for the first call if the emotional state is active at a time of the first call;
  the method further comprising the steps of:
  receiving at least one objective criteria that indicate to use a default incoming call screening treatment, wherein the objective criteria comprise at least one of: time of day criteria, day of week criteria, day of year criteria, and calling party identity criteria; and
  selecting the default incoming call screening treatment for a second call, if the emotional state is not active at a time of the second call.

14. The method of claim 13 wherein if the emotional state is not activated as the incoming call screening treatment criterion, the call is subject to a default call screening treatment;
  wherein the step of selecting the incoming call screening treatment, that corresponds to the emotional state, for the call from the calling party to the called communication device comprises the step of:
  overriding the default call screening treatment in favor of the incoming call screening treatment, that corresponds to the emotional state, if the emotional state is activated as the incoming call screening treatment criterion.

15. The method of claim 13, wherein the emotional state comprises a happy emotional state, wherein the incoming call screening treatment comprises a first incoming call screening treatment, wherein the call comprises a first call, the method further comprising the steps of:

performing the first incoming call screening treatment, that corresponds to the happy emotional state, for the first call; and performing a second incoming call screening treatment, that corresponds to a sad emotional state, for a second call if the sad emotional state is active at a time of the second call, wherein the second incoming call screening treatment is different than the first incoming call screening treatment.

16. The method of claim 13, further comprising the steps of:

adding the indication of the emotional state and the corresponding incoming call screening treatment to at least one entries in an incoming call screening network profile; and accessing the incoming call screening network profile to identify the incoming call screening treatment, that corresponds to the emotional state, to use for the call.

* * * * *

UNITED STATES PATENT AND TRADEMARK OFFICE
CERTIFICATE OF CORRECTION

PATENT NO. : 7,580,512 B2
APPLICATION NO. : 11/168633
DATED : August 25, 2009
INVENTOR(S) : Batni et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 903 days.

Signed and Sealed this

Fourteenth Day of September, 2010

David J. Kappos
*Director of the United States Patent and Trademark Office*